United States Patent
Collins et al.

[11] Patent Number: 5,770,170
[45] Date of Patent: Jun. 23, 1998

[54] RECOVERY OF ZINC FROM SULPHIDIC CONCENTRATES

[75] Inventors: Michael J. Collins; Donald K. Kofluk, both of Fort Saskatchewan, Canada

[73] Assignee: 698638 Alberta Ltd., Fort Saskatchewan, Canada

[21] Appl. No.: 700,143

[22] Filed: Aug. 20, 1996

Related U.S. Application Data

[62] Division of Ser. No. 553,175, Nov. 7, 1995, Pat. No. 5,651,947.

[51] Int. Cl.⁶ .............................. B03D 1/00; C22B 19/00; C22B 3/00
[52] U.S. Cl. .............................. 423/26; 423/98; 423/109; 205/608
[58] Field of Search .............................. 423/109, 98, 26; 205/608

[56] References Cited

U.S. PATENT DOCUMENTS

| | | | |
|---|---|---|---|
| 3,867,268 | 2/1975 | Kawulka et al. | 423/109 |
| 3,968,032 | 7/1976 | Menendez et al. | 423/109 |
| 4,366,127 | 12/1982 | Rastas et al. | 423/26 |
| 4,440,569 | 4/1984 | Weir et al. | 423/98 |
| 4,483,827 | 11/1984 | Heimala | 423/109 |
| 4,505,744 | 3/1985 | Weir et al. | 423/140 |
| 4,545,963 | 10/1985 | Weir et al. | 423/109 |
| 4,832,925 | 5/1989 | Weir et al. | 423/109 |
| 5,651,947 | 7/1997 | Collins et al. | 423/109 |

*Primary Examiner*—Steven Bos
*Attorney, Agent, or Firm*—Arne I. Fors; Joan T. Kerfoot

[57] ABSTRACT

There is provided a novel class of additives, specifically coals, which are useful in zinc extraction processes involving one or more pressure leach stages carried out at temperatures above the melting point of sulphur. Such processes may include those incorporating a single stage pressure leach, a process involving two stage countercurrent or cocurrent pressure leaches or a multistage leach process for recovering zinc, lead and silver from zinc bearing sulphidic materials which also contain lead and silver.

6 Claims, 3 Drawing Sheets

RECOVERY OF ZINC FROM SULPHIDIC CONCENTRATES

This application is a division of application Ser. No. 08/553,175, filed Nov. 7, 1995, now U.S. Pat. No. 5,651, 947.

FIELD OF THE INVENTION

The present invention relates to a novel class of additives useful in zinc extraction processes wherein the process involves one or more pressure leach stages conducted at temperatures above the melting point of sulphur.

BACKGROUND OF THE INVENTION

It is well known that zinc can be recovered from zinc bearing sulphidic concentrates by reacting the sulphides with sulphuric acid in the presence of oxygen at elevated temperatures and pressures. At temperatures above the melting point of sulphur, the elemental sulphur which is formed in the leaching reactions is present as finely divided liquid sulphur globules. As the reaction proceeds, the quantity of these globules increases and they coat or occlude unreacted sulphide particles, rendering them inert to further oxidation. Additives can be added to the process which prevent, or at least substantially inhibit, molten sulphur from coating the unleashed sulphide particles, thereby allowing the reactions to proceed until high extractions of zinc, typically in excess of 95% and preferably in excess of 98%, are achieved, as taught for example, in U.S. Pat. Nos. 3,867,268 and 4,004, 991. Further, the additives assist in the formation of a finely divided leach residue, with good physical handling characteristics. Without the additives, zinc extraction is typically only about 50–70%, and the liquid elemental sulphur may agglomerate, leading to the production of coarse, difficult to handle particles, which plug pipelines and vessels. agglomerate, leading to the production of coarse, difficult to handle particles, which plug pipelines and vessels.

The additives used in this process must be compatible with the oxidation of zinc sulphide, and must not introduce impurities into the zinc bearing process streams. A number of surface active agents have been used for this purpose, including organic compounds such as lignin derivatives, particularly calcium and sodium lignosulphonates; tannin compounds, particularly tree bark and heartwood extracts such as quebracho, hemlock and redwood extracts; orthophenylene diamine; and alkaryl sulphonates, particularly sodium alkylbenzene sulphonates. Calcium lignosulphonate and quebracho have been applied in commercial practice. The current state of the art relating to the use of soluble surface active agents in zinc pressure leaching is summarized in a recent paper entitled "Effect of Surfactants on Zinc and Iron Dissolution during Oxidative Leaching of Sphalerite" by G. Owusu et al., Hydrometallurgy 38 (1995) 315–324.

The majority of these prior art additives are soluble in the acid zinc sulphate solution, and rapidly decompose under the high temperature highly oxidizing conditions of the zinc pressure leach process. Consequently at times it may be difficult to ensure that sufficient surfactant will always be available in the pressure vessel to prevent the occlusion of unleached sulphide particles by molten sulphur. Furthermore, the additives are usually added to make-up water prior to introduction to the autoclaves as a solution which exhibits a tendency to froth and overflow thereby causing potential loss of additive. In extreme cases, if the additive-containing solution fails to contact the zinc sulphide/sulphuric acid slurry, the absence of surfactant can result in the agglomeration of large amounts of molten sulphur into a separate heavy liquid phase, which causes plugging of pipelines and reaction vessels. Furthermore, the prior art surfactants are relatively more expensive, and in the case of the tree bark and heartwood extracts are in limited supply. It will be appreciated therefore that there exists a need for additives functional to prevent the occlusion of sulphide particles by elemental sulphur, which are both inexpensive, readily available and which are not rapidly decomposed under the conditions of the zinc pressure leach process.

SUMMARY OF THE INVENTION

It is an objective of the present invention to provide a class of additives functional in zinc extraction processes, which involve one or more pressure leach stages conducted at temperatures above the melting point of sulphur, wherein said additives are stable throughout the process, relatively inexpensive, do not affect the processing and ultimately the quality of the cathode zinc produced following solution purification and electrolysis and which are easily physically separable from the leach residue.

Initially, there is provided a process having a single stage pressure leach for recovering zinc from zinc bearing sulphidic concentrates. The process comprises dispersing a predetermined amount of finely divided zinc- and iron-containing sulphidic material in an aqueous sulphuric acid solution to form a slurry. The concentration of sulphuric acid added is effective to provide predetermined zinc and iron concentrations in the final leach solution. An effective amount of finely divided particulate coal, compatible with the acid sulphate leach solution, is provided which is functional under the reaction conditions of the following oxidizing reaction step (i.e. the pressure leach), to inhibit the molten sulphur from occluding unleached sulphide particles. The slurry and coal are then reacted, with agitation, with free oxygen bearing gas in an autoclave at a temperature above the melting point of sulphur to thereby effect substantially complete extraction of zinc values from said sulphides as soluble zinc sulphate and concurrent conversion of the sulphide sulphur associated with said zinc values to elemental form. The product leach solution containing the dissolved zinc values is then separated from the solid residue.

The invention further extends to a two stage countercurrent pressure leaching process for recovering zinc from zinc bearing sulphidic materials which comprises dispersing finely divided iron-containing zinc sulphides in an aqueous sulphuric acid solution to form a slurry and providing an effective amount of finely divided particulate coal, compatible with the acid sulphate leach solution, which is functional under the reaction conditions of the first leach step, to inhibit the molten sulphur from occluding unleached sulphide particles. The reactants are leached under a positive partial pressure of oxygen and at a temperature above the melting point of sulphur in two countercurrent stages with said zinc bearing sulphidic materials being fed into the first of said two leaching stages and the spent electrolyte from the subsequent electrolysis being split between the first and second stage leach stages. The quantity of said zinc bearing sulphidic material fed into said first stage leach is adjusted and correlated relative to the quantity of acid fed to both leach stages with said spent electrolyte such that at least about one mole of zinc in sulphide form enters said first leach stage for each mole of acid entering both leach stages and, at the same time, the quantity of spent electrolyte entering both leach stages is controlled such that about one mole of acid enters for each mole of zinc that must be dissolved in said electrolyte to increase the zinc concentration thereof to a predetermined level suitable for treatment of said solution in said electrolysis operation. The first stage leach is operated to extract zinc values from said zinc bearing sulphidic material with concurrent conversion of sulphide sulphur to elemental sulphur to produce a first stage leach residue containing unreacted sulphides, elemental sulphur and precipitated iron, as hydrated iron oxides and jarosites, and a first stage leach solution having a pH above 1 and containing over about 160 g/L dissolved zinc, less than about 10 g/L of free sulphuric acid and less than about 2 g/L of dissolved iron. The first stage leach solution is passed to iron removal and solution purification steps, and then to said electrolysis step. The first stage leach residue is passed to said second stage leach, the said second stage leach being conducted to extract substantially all of the zinc from said first stage leach residue and to produce a second stage leach residue containing any unreacted sulphides, elemental sulphur and precipitated iron and a second stage leach solution containing said extracted zinc, unreacted sulphuric acid and dissolved iron. The second stage leach solution is then separated from said second stage leach residue and said second stage leach solution is passed to said first stage leach. The second stage leach residue is passed to residue treatment processing for recovery of unreacted metal values and by-product elemental sulphur.

Finally, there is provided a cocurrent pressure leaching process for recovering zinc, lead and silver from zinc bearing sulphidic materials that also contain economically attractive quantities of lead and silver. The process comprises dispersing finely divided zinc bearing sulphidic material high in lead and/or silver content and finely divided zinc bearing sulphidic material low in lead and silver content in aqueous sulphuric acid solutions to form separate slurries, and treating these slurries in high acid and low acid pressure leaching stages, respectively. The reactants are leached under a positive partial pressure of oxygen and at a temperature above the melting point of sulphur. The leach solution separated from the high acid leach stage is added with an effective amount of finely divided coal, which is functional under the reaction conditions of the low acid leach step, to inhibit the molten sulphur from occluding unleached sulphide particles, to said low acid leach slurry. The quantity of zinc bearing sulphidic material fed to said low acid leaching stage is adjusted and correlated relative to the quantity of residual acid, and acid equivalent as iron sulphates, in the high acid leach liquor fed to said low acid leaching stage such that at least about 1.3 mole of zinc in sulphide form enters said low acid leach stage for each mole of acid, and acid equivalent as iron sulphates, entering said low acid leach stage. The low acid leach is operated to extract zinc values from said zinc bearing sulphidic material with concurrent conversion of sulphide sulphur to elemental sulphur and to produce a low acid leach residue containing unreacted sulphides, elemental sulphur and precipitated iron, and a low acid leach solution having a pH above 1 and containing over about 160 g/L dissolved zinc, less than about 10 g/L free sulphuric acid and less than about 2 g/L of dissolved iron. Said low acid leach solution is passed to iron removal, solution purification and electrolysis steps. Said low acid leach residue undergoes froth flotation to separate a flotation concentrate containing the unleached sulphides, elemental sulphur and residual coal from a flotation tailings containing the precipitated iron and gangue minerals. Said low acid leach flotation concentrate is passed along with the zinc bearing sulphidic material containing lead and/or silver to said high acid leaching stage, where it is contacted with spent electrolyte from said electrolysis step, said high acid leach being conducted to extract substantially all of the zinc from said low acid leach flotation concentrate and said zinc bearing sulphidic material containing lead and/or silver, there being a stoichiometric excess of sulphuric acid relative to the zinc content of the combined feed materials to said high acid leach stage of from about 50 to 100%, to produce an undissolved residue containing a major proportion of the lead and silver and a leach solution containing a major portion of the zinc and iron. A high grade lead/silver product is separated from said high acid leach residue by froth flotation, with said high grade lead/silver product being recovered as the flotation tailings.

The additives functional, under the conditions of the pressure leach stage or stages, to inhibit molten sulphur from occluding unleached sulphide particles comprise a suitable coal. Such coals would include cannel coal, peat coal, peat, lignite coal, subbituminous, bituminous, semi-bituminous, semi-anthracite and anthracite coal. The preferred coals are lower ranking coals as opposed to high ranking coals. The preferred coal particle size would range up to about 60 microns. The preferred quantity of coal present would be between 5 kg and 25 kg of coal per tonne of zinc bearing sulphidic material. The total carbon content of the coal would preferably range between 40 to 85%. Advantageously, the coal may be recovered from the process residue and subsequently recycled for reuse. The coal, preferably, is added to the zinc concentrate/sulphuric acid slurry directly in the autoclave or may be added at any point during the feed preparation process including washing, grinding or preleaching.

BRIEF DESCRIPTION OF THE DRAWINGS

The present invention will be better understood with reference to the detailed description below and the following figures.

DESCRIPTION OF THE PREFERRED EMBODIMENT

Figure 1:
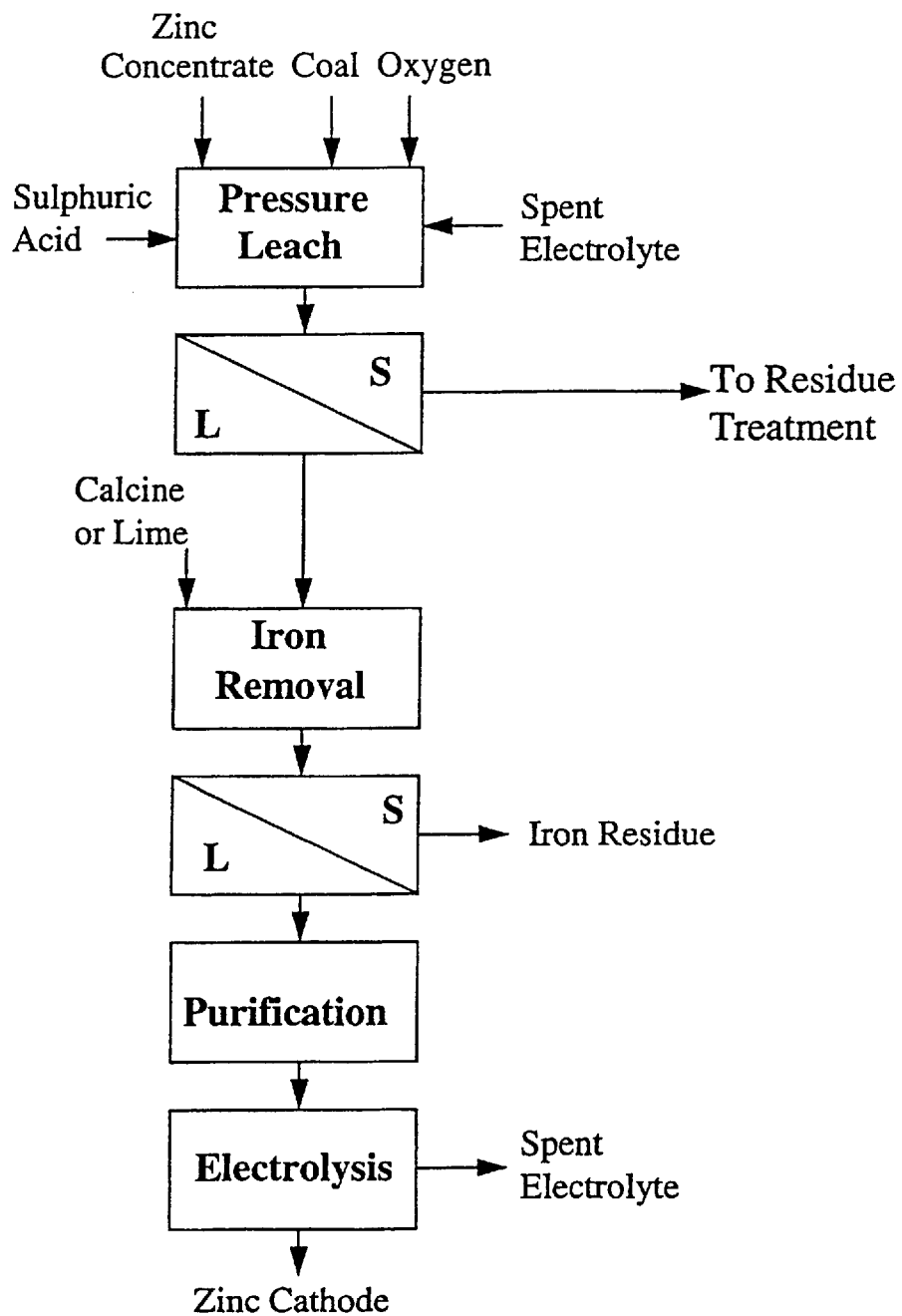
FIG. 1 is a flowsheet of a zinc recovery process of the invention having a single pressure leach stage.

Having reference to the accompanying figures, the processes of the invention will now be described. The invention is particularly applicable to flowsheets incorporating a single stage pressure leach, two stage co- and counter-current leaches and most flowsheets developed for treatment of zinc sulphide concentrates which may also contain lead and silver. In general, the invention is applicable to zinc extraction processes which are carried out at temperatures above the melting point of sulphur.

The processes are applicable to either high or low (i.e. bulk) grade concentrates containing zinc and iron sulphides. However, the starting material normally will be a zinc bearing sulphide concentrate obtained by selective froth flotation of zinc bearing sulphide ores. Such concentrates will often contain other non-ferrous metals in addition to zinc. Exemplary bulk sulphide concentrates may include significant levels of copper and lead, and minor levels of nickel, cobalt, cadmium and in many cases a small but economically significant quantity of silver and precious metals. It is to be understood that the terms zinc bearing sulphidic materials or concentrates as used herein is intended to include such materials and is also intended to include any other high or low grade materials which contain iron either as a naturally occurring or added constituent and economically recoverable quantities of zinc in sulphide form. In order to obtain optimum results, the sulphidic starting material preferably should be in a finely divided particulate form. The particle size has a pronounced effect on the rate of reaction and the degree of zinc extraction obtained in the pressure leaching step/s. It is preferable, in order to realize the fall benefits of the invention, that the starting material be about 90% minus 44 microns (325 mesh Tyler). Material such as flotation concentrates may, in some cases, already be within the preferred size range. Material not already of the preferred size is preferably first pulverized such as by wet grinding.

Optionally, the pulverized concentrate may be leached in dilute sulphuric acid under low temperature atmospheric pressure conditions, to remove easily soluble impurities such as magnesium, manganese, chloride and fluoride. If the sulphides are iron-free or iron deficient, the iron content may be conveniently adjusted at this point by addition of oxidizable iron to the slurry.

All of the processes of the invention include the provision of an additive which is compatible with the aqueous acid sulphate solution and which is functional, under the reaction conditions of the pressure leach stage/s, to inhibit the molten sulphur from occluding unleashed sulphide particles. Preferably the additive would be a lower carbon content coal, which has been found not to introduce undesirable impurities which remain in the leach liquor to subsequently interfere with the electrolysis operation. Such coals may include cannel coal, peat coal, peat lignite coal, subbituminous, bituminous, semi-bituminous, semi-anthracite and anthracite coal. The preferred coals are lower ranking, or intermediate carbon level, coals rather than high ranking, or high carbon level, coals.

Preferably, the carbon content of the coal would range between 40 to 85%. Generally, high carbon content coals, exemplary of which are anthracite coals, have been found to be less effective than coals having a lower carbon content. The coals should be finely divided having particle sizes ranging up to about 60 microns. As a general rule, it is desirable to add the minimum amount of coal that is effective to maximize zinc extraction in any given case. In most cases, the addition of from about 5 to 25 kg of coal per tonne of zinc bearing material, typically about 10 kg/tonne, will be sufficient. It is evident to one skilled in the art that the amount of coal required will be correlative to the nature thereof, i.e. its ranking and particle size and furthermore take into account any carbon contained in the zinc bearing material.

The inherent advantage of utilizing a coal, in contradistinction to the prior art additives, resides in the stability of the coal and its ability to function effectively throughout the process without chemical breakdown thereof taking place. Furthermore, the unreacted coal can be physically separated from the sulphur, unreacted sulphides and iron residue during the residue treatment process and consequently can, if desired, be recovered and reused. In processes involving two pressure leaching stages in which the solid residue from one stage is subsequently leached in the other stage, coal need only be added to one stage, thus representing a substantial saving over the prior art processes utilizing surfactants which have to be added to both leach steps.

By way of background, ASTM standards use fixed carbon and calorific values calculated on a mineral-matter-free basis as the classifying criteria, classification by rank being in accordance to the degree of metamorphism, or progressive alteration, in the natural series from lignite to anthracite. European classifications include (a) The International Classification of Hard Coals by Type and (b) The International Classification of Brown Coals, as taught in "Van Nostrand's Scientific Encyclopedia", 7th Edition, Considine Volume 1, pp662–663. Generically, coal may be defined as a combustible, carbonaceous sedimentary rock formed by the compaction of partially decomposed plant materials. Certain more highly carbonized forms of carbon, exemplary of which are graphite, activated charcoal or coke, have been found unsuitable for the processes detailed herein. Therefore, it is incumbent on one skilled in the art to determine experimentally compounds of the more highly carbonized forms of carbon which are inoperative.

The leaching reaction for single and first and second leaching stages (in processes involving two leach steps) is carried out in agitation-equipped pressure vessels, such as autoclaves, at a temperature above the melting point of sulphur, i.e., above about 120° C., but below about 175° C., preferably between about 135° and 155° C. At temperatures below about 135° C. the reaction rates are relatively slow thereby adversely affecting the economics of the process. During the oxidation reaction, some elemental sulphur is converted to sulphuric acid and the extent of this reaction increases above about 160° C. The generation of some acid is desirable in most cases to compensate for mechanical acid losses and to replace acid consumed in irreversible side reactions by diluent metals such as lead and gangue material such as calcium and magnesium. At temperatures above about 175° C. elemental sulphur is converted to sulphuric acid at a relatively rapid rate and, therefore, more sulphuric acid than desired to maintain acid balance may be produced. Preferably, therefore, the operating temperature should be about 135° C. to about 155° C. The leaching reactions are exothermic and produce enough heat to maintain the slurry within the preferred temperature range without addition of heat from an extraneous source once the reactions have been initiated in a continuous leaching system.

The total pressure at which the leaching reactions are conducted is the steam pressure autogenously generated at the temperature of the oxidation reaction plus the overpressure of oxidizing gas. Preferably, the oxidizing gas is oxygen but air or oxygen enriched air may also be used. The reaction proceeds satisfactorily with an oxygen overpressure above about 150 kPa. However, there is an improvement in reaction rate as the oxygen overpressure is increased. Thus, it is preferred to use an overpressure of oxygen between about 400 to 700 kPa. The upper limit of oxygen pressure will be that imposed by the autoclave employed. As it is generally desirable, for economic reasons, to avoid the use of high pressure autoclaves, generally the upper limit will be about 1000 kPa oxygen overpressure or air overpressure.

The pulp density of the leach slurry fed to the first or single stage leach i.e. the relative quantities of sulphides and solution provided in the leaching step in any given case, is determined having regard to the zinc content of the sulphides and the desired zinc and iron concentration of the final leach solution in general.

The pressure leach residue contains unleashed sulphides, elemental sulphur, iron precipitates such as hydrated iron oxides and jarosites, lead and silver bearing oxidic minerals such as anglesite, gangue minerals and unreacted coal. The unleached sulphides and elemental sulphur are typically agglomerated into fine micropellets, which may be separated from the precipitates, oxidic minerals and gangue by froth flotation, with the unleached sulphides and elemental sulphur reporting to the flotation concentrate. Unreacted coal also reports to the flotation concentrate but as fine particles discrete from the unleashed sulphides/sulphur micropellets, and separable from the unleached sulphides/sulphur micropellets by cyclosizing. The recovered unreacted coal fraction may be recycled to the leaching stage(s) to decrease the requirement for fresh coal addition. Lead and silver values in the pressure leach residue are concentrated in the flotation tailings, and the grade of this material is dependent upon the quantity of iron retained in the pressure leach liquor, as described above.

Turning now specifically to the process for extracting zinc which involves only a single stage pressure leach, as shown in FIG. 1, the amount of acid provided in the slurry make-up step is determined by the target zinc and iron concentration desired in the final leach solution. Sufficient acid must be available to combine as zinc sulphate with zinc values contained in the sulphides to produce the desired target concentration of dissolved zinc. It is generally desirable to produce a leach solution containing about 140 to 180 grams per liter (g/L) of zinc since in most cases zinc will be recovered from the solution by electrolysis and a zinc concentration within this range is preferred for the electrolysis step. Typically, 10 kg of coal containing between 40 to 85% total carbon are required per tonne of zinc bearing material for the reasons described earlier. Once the desired zinc and iron target concentration is determined, the amount of acid required to produce this concentration can readily be calculated having regard to the stoichiometric requirements of the zinc to be extracted as zinc sulphate. In most cases, the slurry make-up solution will be spent electrolyte obtained from the zinc electrolysis step. The liquor will normally contain in addition to residual zinc values, regenerated sulphuric acid equivalent to the amount of dissolved zinc metal recovered in elemental form. Accordingly, except for the initial make-up acid, total acid requirements for the leaching step when conducted in conjunction with electrolytic zinc recovery, are limited to that amount needed to compensate for the mechanical losses and for that consumed by acid reactive diluent materials in the sulphides, such as lead and calcium, which form insoluble sulphates.

The acid/zinc molar ratio of the leach slurry must be adjusted such that there is at least one mole of acid per each mole of zinc. Preferably, there should be an excess of acid in the leach slurry over the amount required to combine stoichiometrically with all zinc values in the slurry, to produce zinc sulphate. However, there is no need for a very large excess of acid since the reaction rate is not greatly increased by such excess and the amount of dissolved iron and free acid in the leach liquor will be undesirably high. Generally the $H_2SO_4/Zn$ molar ratio should be controlled so that it lies in the range of about 1.0:1 to about 1.2:1, preferably 1.1:1.

In summary, therefore, a zinc extraction process having a single stage leach, as exemplified in U.S. Pat. No. 3,867,268, the disclosures of which are incorporated herein by reference, comprises leaching the zinc concentrate with sulphuric acid and a coal additive under the conditions described generally supra. In commercial practice, this single stage pressure leach process is normally operated in conjunction with a conventional roast-leach-electrowinning process in which a major portion of the zinc concentrate feed material is roasted to form zinc oxide calcine, which is leached in return electrolyte in an atmospheric leach circuit.

A portion of the zinc oxide calcine is advantageously utilized to neutralize the sulphuric acid content of the pressure leach liquor. Following the pressure leach step the leach solution containing the extracted zinc values as soluble zinc sulphate is passed to the iron removal circuit where it is treated with zinc oxide calcine or lime to effect neutralization and iron precipitation. From there the solution is passed via conventional solution purification steps to the electrolysis step for recovery of zinc. Sulphur associated with the feed material treated in the direct pressure leach operation is converted to its elemental form in the leach and may be separated from the iron oxide and jarosite residue by flotation.

Alternatively, the single stage pressure leach system may be operated wherein the leach stage is a high acid leach, namely by the provision of a stoichiometric excess of sulphuric acid which is functional to ensure that the iron remains in solution to thereby permit subsequent recovery of potential contained lead and silver values from the leach residue. Again, coal is utilized as the additive as taught herein.

Figure 2:
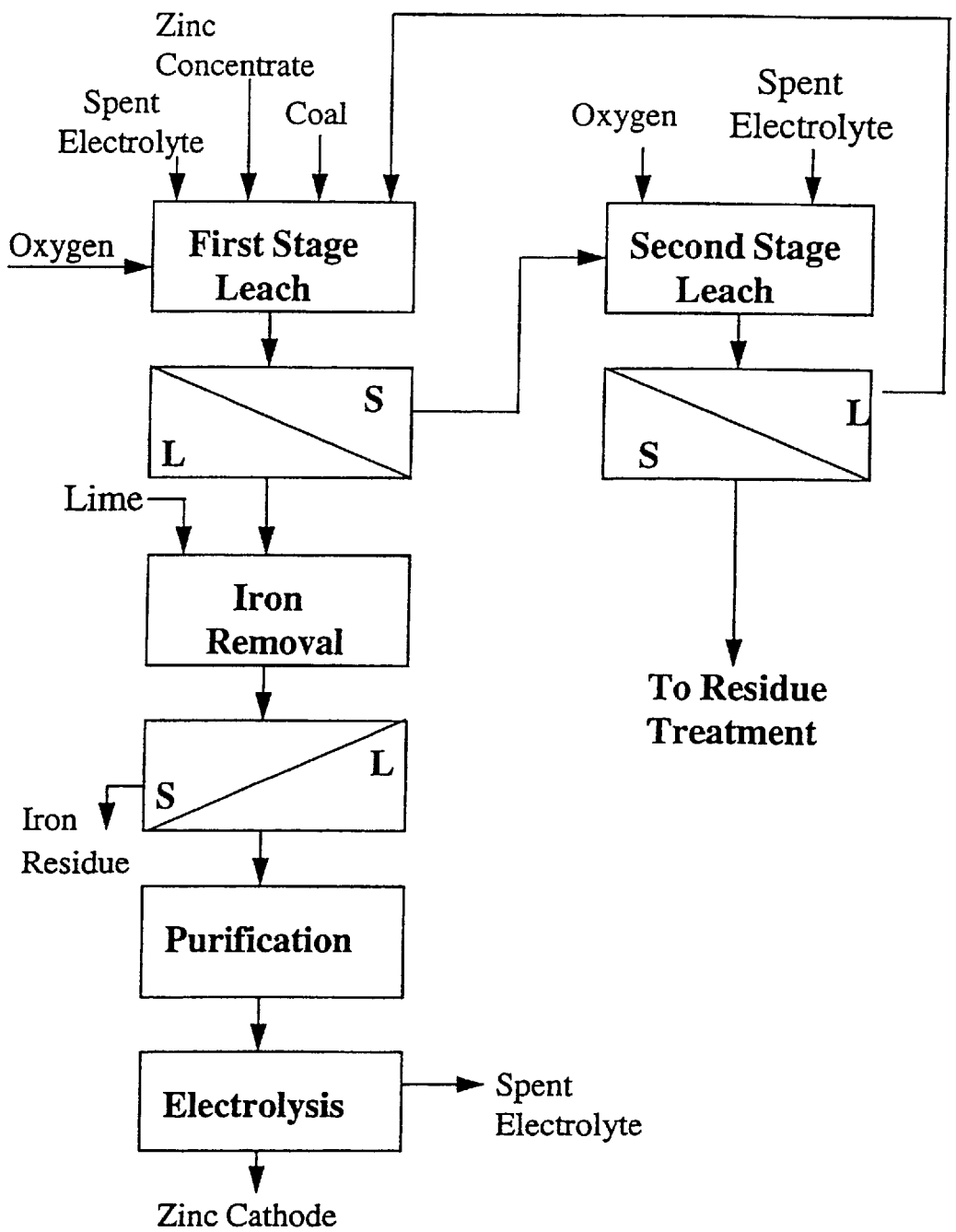
FIG. 2 is a flowsheet of a zinc recovery process of the invention characterized in having a two stage countercurrent pressure leach process.

Having reference to FIG. 2 and to U.S. Pat. No. 4,004, 991, the disclosures of which are hereby incorporated by reference, there is described a zinc extraction process involving a countercurrent two stage leaching process. This process is the preferred option when all the zinc sulphide concentrate is to be treated by pressure leaching, rather than by conventional roasting to zinc oxide. The two stage countercurrent leach configuration produces a pregnant zinc sulphate solution containing lower concentrations of acid and iron, than can be obtained from the single stage process, thus reducing neutralization reagent costs.

In carrying out the invention, the sulphides, after pulverization and optional acid preleaching to remove acid soluble impurities, are slurried with the leach liquor recycled from the second stage leach and a portion of the spent electrolyte and passed to the first stage leach. The feed slurry is prepared using a particulate zinc concentrate, coal additive (in a quantity ranging from 5 to 25 kg/t of zinc bearing material, and preferably a lower ranking coal) and if necessary an iron additive as described above. Generally, it has not been found necessary to add coal to the second stage leach.

Adjustment and correlation of the quantity of sulphides fed to the first leach stage and the quantity of free acid fed to the first and second leach stages ensure that in the first leach stage there is a deficiency of acid under that required to combine with all the zinc and other acid reactive constituents in the sulphides, and in the second leach there is an excess of acid over that required to combine with all acid reactive constituents in the residue from the first leach stage. The result is that in the first stage leach the pH rises, e.g. to 2–3 or higher, as the reaction proceeds and this, in turn, promotes rapid hydrolysis and precipitation of dissolved iron from the leach liquor discharged from the first leaching stage. While only a portion of zinc, e.g. about 75%, will be extracted from the sulphides in the first leach stage, the recycled liquor from the second leaching stage will be high in dissolved zinc, so that the first stage liquor will contain at least about 160 g/L Zn. In the second leaching stage, because there is an excess of acid over that required to combine with the acid-reactive constituents in the first stage leach residue fed thereto, strongly acidic conditions prevail which enable rapid and substantially complete extraction of zinc values from the residue. The required retention times to yield 98% or better zinc extraction are typically 40 to 60 minutes in the first stage and 40 to 120 minutes in the second stage leach.

When the second stage leach is completed, the final leach slurry is discharged from the leaching vessel into a flash tank and then is further flashed into a vessel at atmospheric pressure. The leach solution is separated from the undissolved residue in a conventional liquid-solid separation step and is passed in its entirety to the first stage leach. The residue from the second stage leach stage contains all of the elemental sulphur produced in both leaching stages as well as a small amount of unleached sulphides, hydrated iron oxide, jarosite, insoluble gangue materials and any precious metals present in the starting material. This residue may be discarded to waste, stored for future treatment or treated immediately for recovery of elemental sulphur and other economically recoverable values such as lead and/or silver.

The leach liquor from the first leaching stage, after separation from the undissolved residue in a liquid-solid separation step, is passed to the iron removal operation. Following iron removal, the solution is passed to a conventional purification step and, after removal of precipitated impurities in a liquid-solid separation step, is passed to the conventional zinc electrolysis step.

A more advanced zinc recovery flowsheet utilizing the two stage counter current pressure leach configuration, in which coal may be used to replace the prior surfactants, is described in U.S. Pat. No. 5,380,354, in which improved recoveries of lead, silver and iron from bulk zinc-lead-silver concentrates are provided. The disclosures of this patent are also incorporated herein by reference.

Figure 3:
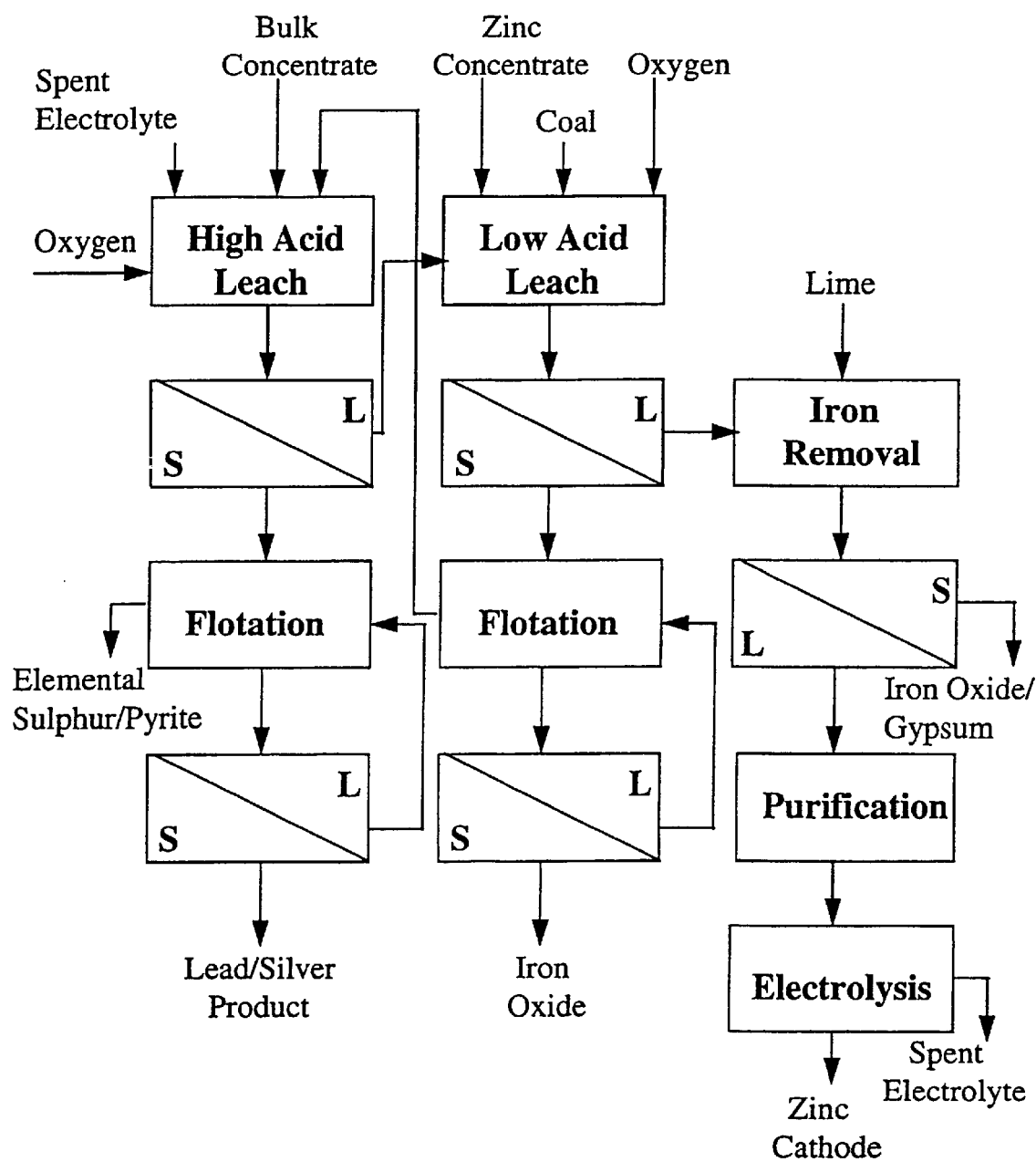
FIG. 3 is a flowsheet illustrative of a zinc recovery process of the invention having a two stage cocurrent pressure leach process.

According to the present invention, the use of coal as the additive to replace the prior art surfactants, may be applied to the co-current pressure leach processes for the extraction of zinc from high lead and silver content bulk concentrates in conjunction with the treatment of a zinc concentrate with low lead and silver contents, disclosed in U.S. Pat. No. 4,505,744, the disclosures of which are incorporated herein by reference. Reference is made to FIG. 3 for correlation with the following description.

A zinc bearing sulphidic material which also contains iron, lead and silver is leached under oxidizing conditions in a high acid pressure leach, essentially as described supra. In a low acid leach step a zinc bearing sulphidic material having a low lead and silver content, is treated. The additive is a finely divided coal as described hereabove, preferably a lower ranking coal, added in a quantity ranging from 5 to 25 kg/t of zinc bearing material and most preferably in a quantity of about 10 kg/t. Typically, it may only be necessary to add the coal to the low acid leach, since the leach residue from this leach step is typically treated by flotation to separate the elemental sulphur and unleached sulphides, including residual coal, from the iron oxides and jarosites, for recycle to the high acid leach step.

The pressure leaching conditions for the high acid pressure leach involve oxidizing conditions at a temperature in the range of from about 120° to 175° C. in aqueous sulphuric acid solution (with spent electrolyte) with an initial substantial stoichiometric excess of sulphuric acid relative to the zinc content of the material of from about 50 to 100% excess of sulphuric acid. The partial pressure of oxygen is preferably in the range 400 to 1000 kPa, and the leaching temperature is preferably in the range 135° to 155° C. The leach residue produced as a result is relatively iron-free. Further, the elemental sulphur produced in the leaching steps and consequently also present in the residue is easily physically separable from the remaining lead and silver-containing residue.

The high acid leach step is continued for a period of time until over 97% of the zinc and over 50% of the iron have dissolved, leaving up to about 45% of the iron present as unreacted pyrite. The undissolved residue then contains little iron oxide or jarosite and contains a major portion of the lead and silver in the original zinc bearing sulphidic material added to the high acid leach stage.

In the low acid leach step, the low lead/silver content zinc concentrate is leached with an excess thereof, the sulphuric acid concentration being such as to effect a 65 to 75% extraction of the zinc content. The pressure leach is carried out under an oxygen partial pressure of from about 400 to 1000 kPa at a temperature of from about 135° to 155° C. to obtain extraction of zinc in the low lead/silver content zinc concentrate with concurrent precipitation of iron and neutralization of acid from the high acid leach solution fed to the low acid leach step.

The leach solution from the low acid leach containing from about 140 to 160 g/L Zn, from about 0.5 to about 2 g/L Fe and about 1 to 10 g/L sulphuric acid is subjected to an iron removal purification step and to any other necessary purification steps and then to a zinc electrolysis step.

Thus, zinc is efficiently recovered from both zinc concentrates and the recovery of lead and silver from the first zinc concentrate with relatively high lead/silver content is facilitated.

Embodiments of the invention for extracting zinc from zinc and iron containing sulphidic concentrates are provided in the following non-limitative examples.

EXAMPLES

Example I

Table I given herebelow provides a comparison of the various coal types used in zinc extraction experiments. The coal size distribution was 100% passing 63 microns and the zinc concentrate utilized was Type A, the analysis of which is given in Table III.

TABLE I

| Test No | Coal Type | Add'n kg/t | C % | C Distribution % | | Zinc Extraction % | | |
|---|---|---|---|---|---|---|---|---|
| | | | | Aliphatic | Aromatic | 20 min | 40 min | 60 min |
| 1 | MC | 50 | 84 | 16.6 | 83.4 | 62.0 | 77.5 | 77.8 |
| 2 | NC | 50 | 83 | 22.6 | 77.4 | 67.7 | 75.0 | 76.9 |
| 3 | OC | 50 | 84 | 23.0 | 77.0 | 65.4 | 77.2 | 80.8 |
| 4 | PC | 50 | 72 | 38.1 | 61.9 | 92.8 | 98.4 | 98.9 |
| 5 | QC | 50 | 56 | 37.2 | 62.8 | 94.3 | 98.4 | 98.9 |
| 6 | RC | 50 | 70 | 43.2 | 56.8 | 90.9 | 97.5 | 98.2 |
| 7 | SC | 50 | 68 | 44.8 | 55.2 | 93.0 | 98.6 | 99.0 |
| 8 | TC | 25 | 59 | 50.5 | 49.6 | 95.0 | 99.1 | 98.7 | wherein C% represents the percentage of organic carbon present in the coal and Add'n refers to the amount of coal added relative to the amount of zinc concentrate. C distribution refers to the relative amounts of aliphatic and aromatic carbon in the coal as determined by NMR spectroscopy.

Example II

This example is illustrative of the comparison of coal quantity utilized with the zinc extraction attained. The concentrate used was Type A (see Table III below) and the coal Type TC. The coal size distribution was 100% passing 44 microns.

TABLE II

| Test No | Addition kg/t | Zinc Extraction % | | |
|---|---|---|---|---|
| | | 20 min | 40 min | 60 min |
| 1 | 20 | 92.4 | 98.2 | 98.6 |
| 2 | 10 | 90.4 | 98.3 | 98.9 |
| 3 | 5 | 87.9 | 96.3 | 98.2 |
| 4 | 2 | 74.1 | 71.0 | 74.8 |
| 5 | 0 | — | — | 60.8 | wherein 'Addition' means the quantity of coal added relative to the quantity of zinc concentrate.

Example III

The effect of zinc concentrate type on the zinc extraction using coal additive TC is given in Table III below. Typically, the zinc extraction was greater than 96%, being more of the order of 98%. This was obtained for concentrates containing 0.1 to 1.8% Cu, 2.2 to 11.8% Fe, 0.1 to 13.6% Pb, 0.4 to 3.3% Si, 26.2 to 33.6% S and 45.5 to 56.2% Zn.

TABLE III

| $ZnC^n$ | L.S. | Concentrate Analysis % | | | | | | Coal kg/t | Zinc Extraction % | |
|---|---|---|---|---|---|---|---|---|---|---|
| | | Cu | Fe | Pb | Si | S | Zn | | 60 min | 120 min |
| A | 1 | 0.20 | 8.00 | 2.58 | 1.23 | 32.2 | 52.4 | 25 | 98.7 | — |
| B | 1 | 0.09 | 3.98 | 3.30 | 1.42 | 30.9 | 56.2 | 20 | 97.2 | 99.7 |
| C | 1 | 1.63 | 6.02 | 1.69 | 0.51 | 30.5 | 55.8 | 25 | 98.8 | 98.9 |
| D | 1 | 0.81 | 7.18 | 0.07 | 0.38 | 33.2 | 56.1 | 25 | 98.9 | 99.4 |
| E | 1 | 1.10 | 10.7 | 0.38 | 0.77 | 31.6 | 52.5 | 25 | 98.0 | 99.0 |
| F | 1 | 0.93 | 11.8 | 1.04 | 0.52 | 32.7 | 49.5 | 25 | 96.3 | 97.4 |
| G | 1 | 0.50 | 6.28 | 0.63 | 1.23 | 32.6 | 55.2 | 25 | 98.3 | 99.3 |
| H | 1 | 0.25 | 9.31 | 0.54 | 0.39 | 33.6 | 53.4 | 25 | 96.5 | 98.4 |
| I | 1 | 1.83 | 2.20 | 13.6 | 3.32 | 26.2 | 45.5 | 25 | 91.6 | 96.2 |
| J | 2 | 0.39 | 7.05 | 5.81 | 1.35 | 31.0 | 51.0 | 20 | — | 98.7* |
| K | 2 | 0.79 | 4.86 | 12.9 | 2.11 | 28.8 | 45.5 | 25 | — | 96.3** | where $ZnC^n$ denotes the zinc concentrate type,
L.S. is the number of leach stages,
*represents a two stage leach consisting of a 40 minute first stage leach and 120 minute second stage leach and
**is a continuous two stage leach test, wherein the first leach stage has a retention of 50 minutes and the second leach stage of 100 minutes.

wherein $ZnC^n$ denotes the zinc concentrate type, L.S. is the number of leach stages, * represents a two stage leach consisting of a 40 minute first stage leach and 120 minute second stage leach and ** is a continuous two stage leach test, wherein the first leach stage has a retention of 50 minutes and the second leach stage of 100 minutes.

Example IV

This example demonstrates the improved zinc extraction obtained in a single stage batch leach with decreasing coal particle size. As shown in Table IV herebelow, the upper coal particle size limit for high zinc extraction in 60 minutes is about 63 microns.

TABLE IV

| Test No | Coal Size Distribution | Zinc Extraction % | | |
|---|---|---|---|---|
| | | 20 min | 40 min | 60 min |
| 1 | −350, +63 μm | 59.7 | 63.4 | 78.3 |
| 2 | −150, +44 μm | 60.4 | 78.4 | 84.7 |

TABLE IV-continued

| Test No | Coal Size Distribution | Zinc Extraction % | | |
|---|---|---|---|---|
| | | 20 min | 40 min | 60 min |
| 3 | −63 μm | 92.2 | 98.4 | 98.9 |
| 4 | −44 μm | 92.4 | 98.2 | 98.6 | wherein the coal type is TC and the zinc concentrate is Type A.

Example V

This example demonstrates that the key interaction for the dispersion of the molten sulphur resides in the contact between the solid coal particles with the molten sulphur, rather than the interaction of an organic extract of the coal with the molten sulphur.

In test number 1, the coal is leached by itself, the coal leachate then being contacted with zinc concentrate. The result, which is identical to using no additives, provides a 61% zinc extraction. In tests 2 and 4, relatively coarse coal is held behind a wire mesh within the autoclave, so that solution may pass through and extract organic species, but there is no contact of the coal with the slurry. This examines the possibility that a short lived organic extract is responsible for the sulphur dispersion. Zinc extraction was limited to about 63%. In tests 3 and 5 direct contact between the relatively coarse coal and the zinc concentrate slurry are examined and demonstrate that zinc extraction increase to 78% and 85% respectively. In test number 6 a smaller sample of finer coal was utilized whereby the quantity of organic species in solution was approximately identical to the other tests, but it was noted that zinc extraction increased to 99%.

TABLE V

| Test NO | Coal Size Distribution | Coal kg/t | Coal Location | Total C mg/L | Zinc Extraction % 60 min |
|---|---|---|---|---|---|
| 1 | −63 μm | 50 | Solution* | 118 | 60.9 |
| 2 | −355, +63 μm | 60 | Basket** | 30 | 63.3 |
| 3 | −355, +63 μm | 20 | Slurry*** | 44 | 78.3 |
| 4 | −150, +44 μm | 40 | Basket** | 46 | 63.1 |

TABLE V-continued

| Test NO | Coal Size Distribution | Coal kg/t | Coal Location | Total C mg/L | Zinc Extraction % 60 min |
|---|---|---|---|---|---|
| 5 | −150, +44 μm | 20 | Slurry*** | 44 | 84.7 |
| 6 | −44 μm | 10 | Slurry*** | 28 | 98.9 | wherein * represents a test in which the coal was leached in simulated zinc pressure leach liquor for 60 minutes under typical zinc pressure leach conditions (150° C.), the coal being filtered off, acid being added to the solution to simulate spent electrolyte, and the solution being charged to the autoclave with zinc concentrate.  denotes a test in which the coal was placed in the autoclave with zinc concentrate, but separated from the slurry by means of a wire mesh. * represents the coal in the autoclave with concentrate using standard leach procedures. By total C is meant the total organic carbon in solution, the carbon concentration being that of the sample being taken after 60 minutes as determined by chemical analysis of the solution.

Example VI

The zinc concentrate type J as shown in Table III was treated in miniplant continuous autoclaves with the addition of 25kg/t of type TC coal having a particle size of 100% passing 63 microns, in a two stage countercurrent pressure leach at 150° C. Coal was added to the first stage only. Overall zinc extraction was 97.7% compared with 97.3% using calcium lignosulphonate as the additive.

Type K concentrate was treated in miniplant continuous autoclaves with the addition of 25 kg/t of type TC coal having a particle size of 100% passing 63 microns, in a two stage countercurrent leach. Coal was added to the first stage only. Overall zinc extraction was 96.3% compared with 96.0% obtained using calcium lignosulphonate.

It will be understood that modifications can be made in the embodiment of the invention illustrated and described herein without departing from the scope and purview of the invention as defined by the appended claims.

We claim:

1. A two stage cocurrent pressure leaching process for recovering zinc, lead and/or silver from zinc bearing sulphidic materials which comprises: dispersing finely divided zinc bearing sulphidic material containing lead and/or silver in an aqueous sulphuric acid solution to form a first slurry, feeding the said first slurry to a first pressure leach stage; dispersing finely divided zinc bearing sulphidic material in an aqueous sulphuric acid solution to form a second slurry, feeding said second slurry to a second pressure leach stage; providing an effective amount of finely divided coal to said second pressure leach stage which is functional to inhibit molten sulphur from occluding unleached sulphide particles; leaching said zinc bearing sulphidic materials in said second pressure leach stage under a positive partial pressure of oxygen at a temperature above the melting point of sulphur, adjusting and correlating the quantity of zinc bearing sulphidic material fed to said second pressure leach stage relative to the quantity of acid, and any acid equivalent such as iron sulphates in said second pressure leach stage, such that at least about 1.3 mole of zinc in sulphide form enters said second pressure leach stage for each mole of acid and acid equivalent as iron sulphate, to extract zinc values with concurrent conversion of sulphide sulphur to elemental sulphur to thereby produce a second pressure leach stage residue containing unreacted sulphides, elemental sulphur gangue minerals and precipitated iron, and a second pressure leach stage solution having a pH above 1 and containing about 160 g/L dissolved zinc, less than about 10 g/L free sulphuric acid and less than about 2 g/L dissolved iron; separating the second pressure leach stage solution from the second pressure leach stage residue; precipitating iron from the second pressure leach stage solution and purifying the solution from which the iron has been precipitated, recovering zinc from the purified solution by subjecting the purified solution to electrolysis; subjecting said second pressure leach stage residue to froth flotation to separate a flotation concentrate containing unleached sulphides, elemental sulphur and coal from a flotation tailings containing the precipitated iron and gangue minerals; passing said second pressure leach flotation concentrate and spent electrolyte from said electrolysis step together with said zinc bearing sulphidic material containing lead and/or silver fed to said first pressure leach stage; conducting said first pressure leach stage under a positive partial pressure of oxygen at a temperature above the melting point of sulphur to extract substantially all of the zinc from said second pressure leach flotation concentrate and said zinc bearing sulphidic material containing lead and/or silver in a first pressure leach stage solution, said first pressure leach stage solution having a stoichiometric excess of sulphuric acid relative to the zinc content of the feed materials to said first pressure leach stage of from about 50 to 100% to thereby produce a residue containing a major proportion of the lead and/or silver and a leach solution containing a major portion of the zinc and iron; passing said leach solution from the first pressure leach stage to the second pressure leach stage; and subjecting said first pressure leach stage residue to froth flotation to recover the lead and/or silver as flotation tailings.

2. The process as set forth in clam 1 wherein said finely divided coal has a particle size which ranges up to about 60 microns.

3. The process as set forth in claim 2 wherein the quantity of coal ranges between 5 and 25 kg of coal per tonne of zinc bearing sulphidic material.

4. The process as set forth in claim 3 wherein the total carbon content of said coal ranges between 40 and 85%.

5. The process as set forth in claim 4 wherein the coal has an aliphatic carbon content of below about 80% and above about 20%.

6. The process as set forth in claim 4 wherein the coal has an aliphatic content of between about 25% to 55%.

* * * * *